United States Patent [19]
Harper

[11] Patent Number: 5,432,776
[45] Date of Patent: Jul. 11, 1995

[54] MESSAGE NETWORK MONITORING

[75] Inventor: John A. Harper, Golfe Juan, France

[73] Assignee: Digital Equipment Corporation, Maynard, Mass.

[21] Appl. No.: 129,513

[22] Filed: Sep. 30, 1993

[30] Foreign Application Priority Data

Oct. 1, 1992 [GB] United Kingdom ............ 9220688

[51] Int. Cl.$^6$ ............... H04M 15/08; H04M 15/10; H04M 15/04
[52] U.S. Cl. ................... 370/17; 379/134; 379/133; 370/60
[58] Field of Search .......... 370/13, 17, 58.1, 58.2, 370/58.3, 60, 60.1, 94.1, 94.2, 110.1, 68.1; 379/112, 113, 133, 134, 137

[56] References Cited

U.S. PATENT DOCUMENTS

| | | | |
|---|---|---|---|
| 4,723,270 | 2/1988 | Okamoto et al. | 379/134 |
| 4,778,718 | 11/1988 | McNabb et al. | 379/113 |
| 4,788,718 | 11/1988 | McNabb et al. | 379/134 |
| 4,817,080 | 3/1989 | Soha | 370/17 |
| 4,887,260 | 12/1989 | Carden et al. | 370/60 |
| 4,899,335 | 2/1990 | Johnson, Jr. et al. | 370/60 |
| 5,038,345 | 8/1991 | Roth | 370/94.1 |
| 5,042,032 | 8/1991 | Dighe et al. | 370/94.1 |
| 5,101,402 | 3/1992 | Chiu et al. | 370/17 |
| 5,231,593 | 7/1993 | Notess | 370/17 |

FOREIGN PATENT DOCUMENTS 2149625 10/1984 United Kingdom.

Primary Examiner—Wellington Chin
Attorney, Agent, or Firm—Kenneth F. Kozik

[57] ABSTRACT

A digital message routing network has at least some nodes at which messages are monitored for accounting purposes. Such a node contains means for generating and compressing accounting digests, each of which consists of a key K representing the nature and route of the message and a value V associated with the message. For each message, a digest is produced in register 30, and copied into a location in a first memory 22D at a location determined by hashing its key; further digests with the same key are compressed into the digest already in that location. A second memory 23D is operated as a cyclic buffer with head and tail counters HDCT 40 and TLCT 41. The address of the head of the buffer, ie the valid area of memory 23D, is included as an index I in each digest in the first memory 22D as that digest is created. Each time a digest is created or changed in the first memory 22D, it is copied into the second memory at the location in the second memory determined by its index. Digests are read out from the second memory in blocks; the corresponding digests in the first memory thereby become invalid, and have to be restarted by initializing their values and giving them new indexes.

15 Claims, 2 Drawing Sheets

MESSAGE NETWORK MONITORING

The present invention relates generally to the monitoring of messages in message switching networks, and more specifically to the management of accounting information in switching nodes therein.

MESSAGE SWITCHING NETWORKS

A message switching network, in the present sense, can generally be taken as comprising a network of message forwarding stations (switching nodes) by means of which various message originating and receiving stations (which we here term end-users) are interconnected. Messages are originated and received by the end-users; the role of the network is to route the messages between the end-users. A switching node is generally connected to several others. Each node has an input port for each end-user (or group of end-users on an area network such as a LAN) and each other node it is connected to, and means for inspecting each incoming message to determine which node or end-user it should forward the message to (ie which output port it should send the message out on).

It is evident that there will be various messages (or, often, streams of messages) passing through the network between the various end-users. (For present purposes, we need not distinguish between the terms "message", "frame", and "packet".) The individual messages of a stream of messages between a given pair of end-users need not all follow the same route through the network. The network has the responsibility of dealing with each message individually, and in some networks, it may happen that different messages of a single stream follow different routes through the network.

There are many variations of network architecture. In a sense, the simplest possible system has all end-users connected to a common message medium (so that there is no switching node in the above sense). Another extremely simple form has all end-users connected to a single switching node.

These systems are however suitable only for networks which are generally geographically compact and have only a fairly small number of end-users. For somewhat larger systems, there will be a plurality of switching nodes, with each end-user being connected to only a few nodes (often, only a single node). For larger systems still, the nodes themselves may be grouped into groups or areas, with the nodes in each area being treated as associated and the areas being treated as distinct from an administrative point of view.

USAGE MONITORING

It is often desirable to monitor the usage of a message switching network, for a variety of reasons. It may be desirable to detect areas of the network where the usage (message flow) is high, so that the location of bottlenecks can be detected and appropriate action taken. Suitable monitoring may be needed to detect errors in the operation of the system. And, more recently, interest has been growing in the possibility of charging users for use of the system.

A great variety of monitoring techniques are obviously possible. The message flow through any given node can obviously be monitored (provided the node has the appropriate capacity). The message flow to and from a given end-user can obviously be monitored by that end-user (provided that the appropriate discipline can be exerted to ensure that the end-user carries out the monitoring properly).

However, many usage monitoring functions which might be desirable are either technically difficult to perform or can in principle be performed without great difficulty but turn out in practice to impose heavy additional loading on the network.

For example, one might consider taking the load which each message imposes on the network as a measure of the number of switching nodes which that message passes through on its way from the originating end-user to the destination end-user. This could be implemented by including a distance count (hop count) in each message. The count would be set to 0 when a message is sent out by an end-user, and the switching nodes would be arranged se that each intermediate one increments the distance count when a message passes through it to another node, and the final one extracts the count as it passes the message to the destination end-user.

To be of value, the extracted counts would of course have to be accompanied by some further identifying information, and would have to be assembled and processed in some way.

The addresses of the destination end-users would be relatively easy to keep, because there are relatively few end-users for each switching node. If each end-user is connected to a single switching node, then that node will automatically collect all the information relating to that end-user. If an end-user can be connected to more than one node, then the information relating to an end-user may be distributed among several switching nodes, and has to be collected together into a single location. Since only a few nodes are connected to any given end-user and those nodes are generally relatively close together, this task does not appear unduly severe (although there may be considerable difficulties when it is considered in detail).

However, it is more usual to measure loading with reference to the sources of the messages producing the loading, rather than to the relatively passive receivers of such messages. To do this, the usage information from each message would have to be collated with reference to the sources of the messages. This might be done by sending the loading information for each message back to the originating end-user (or a station near to it), or by using a single central station to collate all loading information. In either case the number of messages passing through the system is doubled, so such monitoring comes close to halving the capacity of the system (as well as requiring additional functionality at the switching nodes).

The network can of course be monitored at selected locations, but that is obviously a rather coarse technique. Messages which do not pass through the selected locations will not be registered at all, while those which happen to pass through more than one such location will be registered more than once.

There is therefore a need for a useful and efficient method of monitoring a message switching network which gives a reasonable measure of the usage due to message origination without imposing unduly onerous requirements on the network.

Our earlier patent application, EP 0 467 569, Message Network Monitoring, inventors Harper and Dolan, describes a technique which is valuable for this purpose. The principles of that technique are applicable to a hierarchical switching network (ie with a hierarchy of stations and a corresponding hierarchy of links), such as those envisaged in the standards ISO 10589 and ISO TR 9577. Such a network may, for example, have the end units connected together directly (via LANs) or via common switching nodes through level 0 (L0) links; the nodes connected together via level 1 (L1) links; and the nodes grouped into areas which are connected together via level 2 (L2) links. The basic principle of that technique is that messages should be monitored—ie their passage should be recorded in some way—when they cross levels in the hierarchy.

The fundamental advantage of this is that if the network is "well-behaved"—that is, if a message between end-users passes steadily up the hierarchy and back down again with only one change of direction—then messages can be accurately counted and categorized according to the distances which they travel through the network. (Any convenient definition of "distance" may be used, such as hop count (possibly weighted), or a more abstract interpretations such as a combination of the source and destination addresses and the type and service class of the message.) Messages are thus monitored—ie their passage is recorded—when they cross levels in the hierarchy. Thus for networks which are well-behaved (or can be made so), messages are accurately counted and categorized according to the distances which they travel through the network.

ACCOUNTING DIGESTS

In principle, the application of that technique does not present any major problems. Each time a message is monitored, a control message which we will term an accounting digest is generated, and these accounting digests can be sent to a network management station for suitable processing. However, there are two aspects to this which may cause difficulties for which further attention and development is desirable or necessary.

First, the number of accounting digest messages sent through the network will be comparable to the number of "primary" or information messages. It is therefore desirable to accumulate the accounting digests in the node and process them into a smaller number of digests which are then sent to the network management station. (Also, the digests can be accumulated and sent as a single message containing a block of digests.)

Second, some nodes of the network may have very high speed ports (eg in the region of 100 Mbits/sec). The node circuitry associated with such ports obviously has to satisfy stringent operating conditions in order to process the headers of incoming messages fast enough. It also has to generate and process accounting digests, It is highly desirable to minimize the loading imposed by this task, so that this task can be handled by the same circuitry which carries out the processing concerned directly with message handling and forwarding, rather than additional circuitry for accounting digest processing being required.

Going back for the moment to the subject of the penultimate paragraph, this requirement imposes certain constraints on the nature of the accounting digests. We shall assume that a digest for a message consists of a key and a value, with the key being determined by the message header and the value by the message size.

The message header contains the message source and destination addresses and, generally, other information such as message type and priority. (The header may also contain other information, such as a hop count, which is not relevant for present purposes.) For convenience, we shall take the digest key as consisting of a source address identifier which we will term a handle, a destination address handle, and a 1-byte type (though it will be realized that these details are not essential).

The use of handles (which can conveniently be 2 bytes long) rather than the full addresses results in a major reduction in the length of the digests. The handles are chosen so that messages which may need to be treated differently for accounting purposes can always be distinguished; however, those which are treated as equivalent at the node where the accounting digest is generated can have the same handle. Thus the handles can conveniently be chosen so that addresses within the area of the node (router) all have distinct handles (though even here, local addresses may contain a final byte used for eg multiplexing, and this byte can be ignored in choosing handles); for other areas in the local domain, all addresses in the same area can be given the same handle; and for other domains, the handles need only distinguish between those domains.

The use of handles is convenient for the processing of the digests in the node. However, the significance of the handles is internal to the node. When the digests are transmitted to the network management station, the handles therefore have to be converted back to addresses. This involves a loss of precision in the addresses, but, as just noted, the handles are chosen so that this does not adversely affect the accounting functions.

We shall also take the digest value as consisting of two components, the message length and a message number count (which is necessarily 1 for a digest obtained from a single message). The message length may be fixed, or explicitly indicated in the message header, or implicit in the encoding of the message (eg by an end-of-message marker) as in the standard data link protocol HDLC (ISO 3309).

With this digest structure, the digests from successive messages in a stream of messages of the same type will have identical keys. This fact makes it feasible to compress digests. A group of digests with a common key can be compressed into a single compound digest with the same key, the value of the resulting compound digest being obtained simply by adding the values of the individual digests which are being compressed into the compound digest. The values are of course added field by field, so that the message length of the value of the compound digest will be the sum of the message lengths of the values of the individual digests being compressed, and the message number count will be the sum of the message number counts of those individual digests.

There is thus no significant difference between original and compressed digests. The only distinction is in the contents of the message count and message length fields of the value component. Any group of digests with a common key can be compressed into a single digest, regardless of the various message number counts.

It will be realized that the digest as we have defined it does not necessarily have to be generated by the accounting technique of the patent application noted above.

NODE STRUCTURE

Returning now to the node structure, this may conveniently consist of a plurality of link or port units coupled through a common data bus to a common message memory. The link units may be of various different types having different speed ports; low-speed types generally have a plurality of ports, while high-speed types generally have a single port. The node also contains means (shown for convenience as an address recognition engine (ARE) coupled to the link units) for looking up addresses quickly and efficiently, and a management processor coupled to the ARE.

A link unit must necessarily have enough processing power to generate accounting digests for the messages entering it. These digests will be passed to a node digest memory which is coupled to the node management processor. This processor will carry out compression on the digests in the node digest memory, and at convenient intervals it will forward the compressed digests to the network management station. The node management processor will construct control messages for this purpose; each such message can conveniently contain a block of digests (with different keys, of course), as mentioned above.

For a low or medium speed link unit, the rate at which accounting digests are generated will be modest. The link will generally have adequate processing power to compress them; on the other hand, the node management processor will also generally have enough power to compress them. There is therefore considerable freedom in deciding how the digest processing should be shared between the link unit and the node management processor.

In addition to processing the digests, the link unit and the node management processor must both have adequate storage capacity to store them. It is convenient to regard the digests as being stored in a distinct node digest memory associated with the node management processor (though in practice it may be a portion of a node memory of which other portions are used for other purposes).

As discussed above, a digest consists of a key plus a value. Digests with different keys must be kept separate, though digests with the same key can be compressed together. It is impracticable to use the key directly as the memory address for storing the digests, because that would require an excessively large memory with a very low degree of utilization. It is therefore appropriate to use a hash technique to derive the storage addresses for the digests.

Hashing is a well known technique which essentially involves subjecting the key to some algorithmic process which reduces its bit length substantially. Provided that the algorithm is chosen appropriately to give good randomness, the chance of two different keys giving the same hash address will be reasonably low, and there are well-known techniques for resolving any coincidences which do occur, so that digests with different keys will never be confused and compressed together.

The whole of each digest has to be stored in the memory, so that the address handles can be recovered. These cannot be recovered from the hash address, because there are many possible keys for each hash address.

THE PROBLEM

For a high speed link unit, the processing situation is the opposite to that for a low or medium speed link unit. The node management processor is generally not a high speed device, so it cannot handle an uncompressed stream of digests from the link unit (or more than one such link unit). The link unit must therefore accumulate and compress the digests, and forward them to the node management processor only at relatively infrequent intervals. However, the link unit processor is occupied mainly in direct handling of the messages passing through the link unit, and has relatively little spare processing power for processing the digests.

The main object of the present invention is, therefore, to provide an efficient way of handling digests, particularly in a high-speed link unit (though it will be realized that the principles of the present invention can also be applied in low and medium speed link units and the node management processor, and indeed in other designs of node).

THE INVENTION

Accordingly the present invention provides, in a link unit in a node in a digital message routing network, digest processing means for generating and compressing accounting digests each of which consists of a key representing the nature and route of the message and a value associated with the message, characterized in that the digest processing means comprise: a first memory into which digests are written and compressed at locations determined by their keys; a second memory operated as a cyclic buffer the address of the head of which is included in each digest in the first memory as it is created; and copying means for, each time a digest is created or changed in the first memory, copying it into the second memory at the location in the second memory determined by the index of the digest.

THE EMBODIMENT

An embodiment of the invention will now be described, by way of example, with reference to the drawings, in which.

Figure 3:
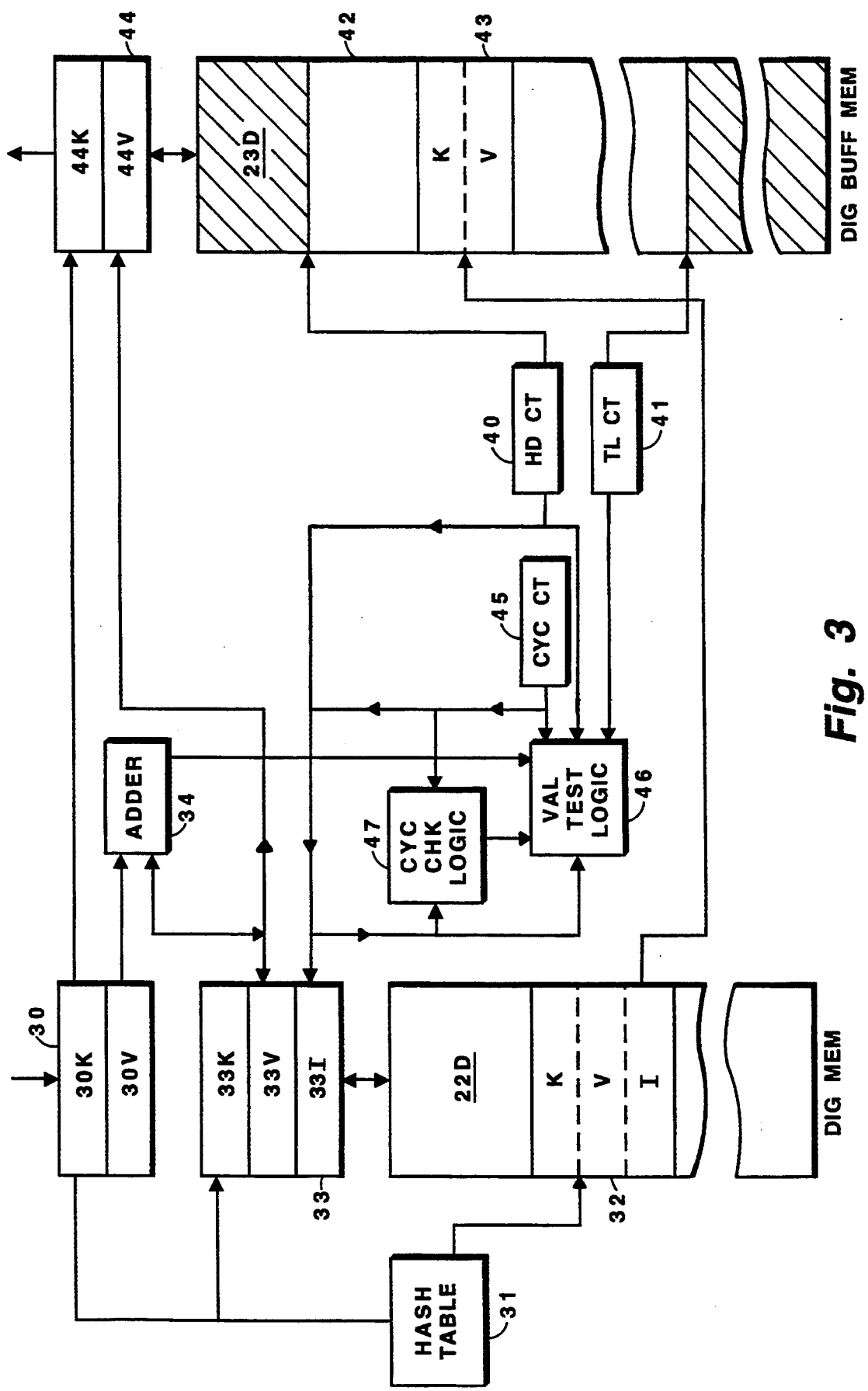
FIG. 3 is a more detailed block diagram of the logical organization of the fast link unit.

In FIG. 3, signal flow lines are shown generally straight, while "pointing" (ie the selection of memory locations by address registers) is shown by curving lines.

NODE STRUCTURE

Figure 1:
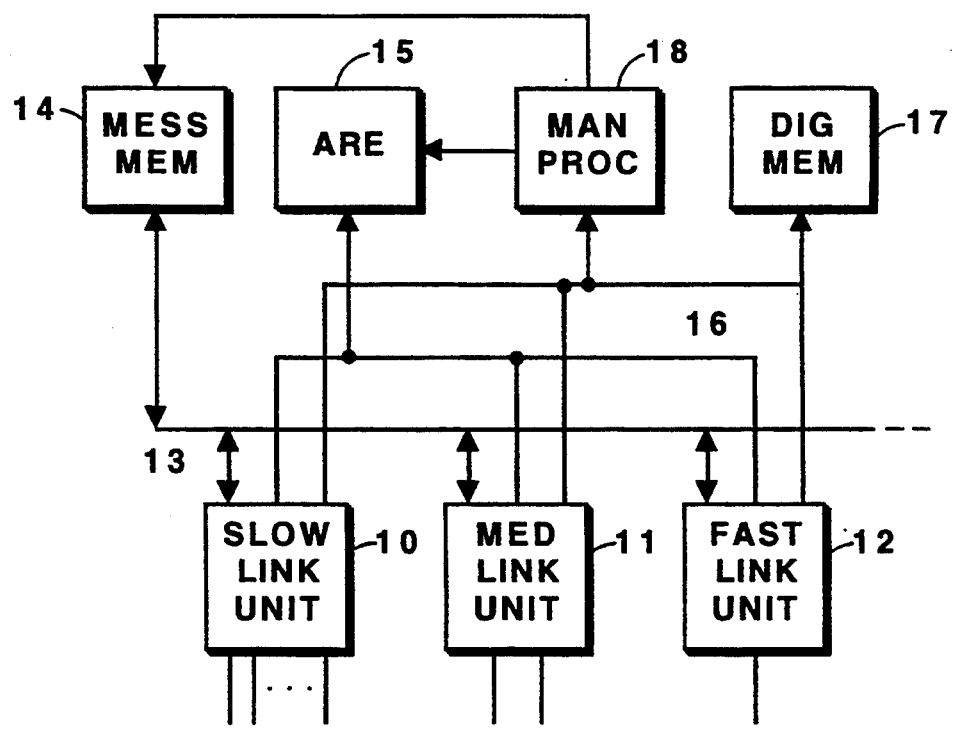
FIG. 1 is a simplified block diagram of a node.

Referring to FIG. 1, a node is shown as having a low-speed link unit 10, a medium-speed link unit 11, and a high-speed link unit 12, all coupled via a common data bus 13 to a common message memory 14. The low-speed link unit 10 has typically 8 ports; the medium-speed link unit 11 may have 2 or 4 ports; the high-speed link unit 12 normally has a single port. There may be more than one of any or all of the various types of link unit coupled to the bus 13.

A message may be received at any port of any link unit. Any incoming message is passed through the link unit onto the data bus 13 and thence into the memory 14. In due course, the message is read out from the memory 14 and passed via the bus 13 to the appropriate output port via the appropriate link unit (which may or may not be the same one that it entered by).

When a link unit receives an incoming message, it extracts and processes the header of the message as well as passing the message (or the information or data part thereof) to the message memory 14. This header processing is required to determine some aspects of how the message is to be processed (eg priority, incrementing its hop count and/or age, possible deletion if the age or hop count of the message is too large, &c). Header processing is also required to determine the destination of the message. The header will contain a destination address, and the link unit passes this to the address recognition engine 15, over a coupling shown as a bus 16. The ARE 15 uses table look-up to determine the appropriate port to send the message out on.

The link unit also processes the header of the incoming message to generate the accounting digest for the message. For this purpose, it sends the source address (along with the destination address) of the header to the ARE 15, and receives back the source and destination handles (which are looked up by the ARE in the same way that it looks up the output port). The link unit extracts the message type from the message header, and combines the handles with this message type to form the digest key. The link unit also extracts the message length from the message header and combines this with message number count of 1 to form the digest value. The link unit thus generates the complete digest.

As discussed above, the link unit stores the digest in a link hash memory (ie a memory space in the link unit devoted to the storage of digests and addressed by hashing the digest key). Each time the link generates a new digest, it checks the memory location for that digest key to see whether there is a digest already stored there. If there is, then it reads out the value of that digest, adds it to the value of the new digest, and stores the resulting value (ie the value of the compressed digest which is thereby produced) back into the memory.

At convenient intervals (typically 10–100 s), blocks of digests are passed from the link units to a node digest memory 17. A node management processor 18 is coupled to the node message memory 14, the ARE 15, and the node digest memory 18, and controls the compression of digests in the memory 18. At convenient intervals, this node management processor constructs control messages containing blocks of compressed digests from the memory 18, converts their handles back into addresses, and sends them to a network management station (via a suitable link unit).

As will be seen, the present fast link unit achieves this forwarding of the digest information in a timely manner, ie within a bounded period. The maximum amount of information loss which may result from a failure or shutdown of the node, or of the fast link unit in the node, is therefore kept within limits.

Although the memories 14 and 17 are shown as separate, in practice they may be different areas of a common physical memory (which may also contain the tables required by the ARE 15).

FAST LINK UNIT STRUCTURE

Figure 2:
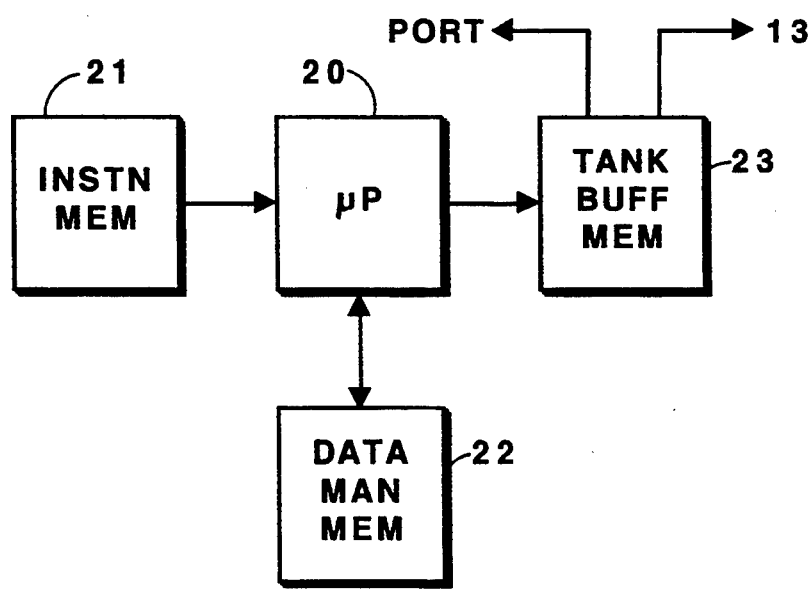
FIG. 2 is a simplified block diagram of a fast link unit.

FIG. 2 is a simplified diagram of those parts of the fast link unit 12 relevant to the handling of accounting digests. The link unit comprises a microprocessor 20 coupled to an instruction memory 21, a node data management memory 22, and a buffer memory 23. The buffer memory 23 (which we will term a tank memory) is connected between the node port PORT and the node data bus 13, and all messages passing through the port pass through this tank memory. This memory is therefore optimized for this task; specifically, it is designed for fast writing and fast block reading, but reading of individual locations, although possible, is slow.

To handle the processing load, the microprocessor 25 is a fast unit, operating at 25 MIPS (millions of instructions per second). A message length is typically some 20 microseconds, and requires some 360 instruction executions (ie roughly 15 microseconds) for its handling. It is therefore evident that the generation and processing of the associated accounting digest must be achieved efficiently.

FAST LINE UNIT OPERATION—DIGEST HANDLING

FIG. 3 shows in more detail the logical organization of those parts of the fast link unit concerned with handling accounting digests. One area of the node data management memory 22 is reserved for digest storage; this is shown as the digest memory 22D in FIG. 3. One area of the tank memory 23 is also reserved for digest storage; this is shown as the digest buffer memory 23D in FIG. 3. In addition, there are various logic units, registers, &c concerned with digest handling. The operations are controlled and largely performed by the microprocessor 20.

We can assume that each time a message is received by the fast link unit, a digest is created by the microprocessor 20 and placed in a new digest register 30. As discussed above, a digest consists of two parts, a key and a value, and register 30 has two sections, a key section 30K and a value section 30V. The contents of the key section 30K are passed to a hash table unit 31, which hashes them to produce an address which selects a location 32 in the digest memory 22D, and the contents of this location are read out into a read-write register 33. The register 33, and each location in the memory 22D, has three sections: a key section K, a value section V, and an index section I.

In general, the key section of each digest location will contain a key, and this key never changes (as long as the digest is valid, as discussed below). It is therefore unnecessary to read the key part of the digests from the memory 22D into the register 33. Obviously a key must be written into the memory 22D when a new digest is being created (with either the digest location in memory 22D being empty or its current contents being effectively erased); these situations are discussed below.

As will be seen, the contents of the digest locations in memory 22D are copied into the digest buffer memory 23D, and the contents of the digest locations in memory 23D are transferred into the node digest memory 17. The copying from memory 22D to memory 23D occurs substantially immediately on the creation or updating of the digest in memory 22D, while the transfer from memory 22D to memory 17 occurs at relatively infrequent intervals. The writing of individual digests into the memory 23D and the reading of a block of digests from it are, as discussed above, both fast. The reading of individual digests from memory 23D (which would be slow) is never required, because the corresponding identical version in memory 22D can be read instead.

As long as a digest remains in the link unit, it can be compressed with further digests with the same key. However, once a digest has been transferred to the node digest memory 17, it must be effectively erased from the link unit. Any further compression involving that transferred digest must be performed by the node management processor 18. The link unit has no further knowledge of the digest it has transferred to the node digest memory; in particular, it does not know, when it sends the next (probably compressed) digest with the same key to the node digest memory, whether the last digest it sent is still in the node digest memory or has been sent off to the network management station. Any further digests with the same key appearing in the link unit must therefore be treated as new digests (though they can of course be compressed with each other).

Thus for a digest in the digest memory 22D, there may or may not be a copy still in the digest buffer memory 23D. If there is, then the digest in memory 22D will be termed valid; if the corresponding digest in memory 23D has been effectively erased, as discussed above, then the digest in memory 22D will be termed invalid. The criteria for determining validity will be discussed later.

If, when a new digest is created in register 30, the corresponding digest in memory 22D is valid, the value in register section 33V is passed to an adder 34. The value of the new digest in register section 30V is also passed to the adder, which adds the two values and returns the result to the register section 33V. The new value, ie the contents of the register section 33V, is then written into the memory location 32. (The contents of the other two sections 33K and 33I are unchanged, and hence do not need to be written back into the memory 22D.)

When a valid digest is updated in memory 22D, its updated version must also be copied into the digest buffer memory 23D. The digest as copied into memory 23D consists only of the basic two digest components of key and value (ie without the index component). The key can be taken from register section 30K; the value is taken from register section 33V. For a digest which is being updated rather than created, the key will of course already be in the buffer memory 23D and need not be copied across and rewritten.

Memory 23D is organized as a cyclic buffer, with an associated head pointer register 40 and tail pointer register 41. Digests awaiting transfer to the node digest memory 17 are held in the valid zone 42 between the addresses pointed to by the head and tail pointers; the contents of the rest of the memory (shown shaded) are irrelevant and effectively erased. (The head and tail pointers rise cyclically through the memory, reappearing at the bottom of the memory as they disappear off its top. Hence the valid zone will on occasion consist of two separate areas, one at the top of the memory and the other at the bottom.) In addition to the head and tail pointer registers 40 and 41, there is a cycle counter register 45, which contains a count which starts at zero and is incremented each time the valid zone on memory 23D cycles round the memory. (More precisely, it is incremented each time the head pointer cycles back to zero.)

At appropriate intervals, blocks of digests are transferred from the memory 23D to the node digest memory 17. For this, a block of digests is read out using the tail pointer to read them out, the tail counter being incremented appropriately. This block read is fast, as discussed above.

In extreme conditions, it may be possible for new digests to be created so fast that the writing of them into the memory 23D may advance the head pointer close to the tail pointer, with the invalid zone becoming very small, or even, in the limit, disappearing. If such conditions are possible, it is desirable to inhibit the copying of new digests into the memory 23D, as it is preferable to prevent new digests from over-writing digests already in memory 23D which have not yet been copied into the digest memory 17. This minimizes the loss to the system of accounting "value" (in a broad sense), because digests already in memory 23D are likely to have a greater accounting value (in the broad sense) than new digests.

A similar situation may occur in slightly less extreme conditions. On a block read-out, successive block locations are read out sequentially. The tail pointer jumps immediately to the end of the block being read out, to indicate the valid zone (which excludes the block being read out). However, the copying of new digests into the memory 23D should only be permitted up to the point to which the reading out the the block has actually proceeded, rather than all the way up to the valid zone. To achieve this, a second (subordinate) tail pointer (not shown) may be used in addition to the (primary) tail pointer already described. This second pointer is advanced gradually as successive locations in the block are read, and the copying of new digests into memory 23D is permitted only up to the location pointed to by the subordinate tail pointer. (This automatically takes care of the even more extreme condition discussed in the previous paragraph.)

Returning to the copying of a valid digest from memory 22D to memory 23D, a location in memory 23D must be selected. This location is selected by using the index section of the digest in memory 22D (or section 33I of register 33). The index in fact consists of two components, a high-order cycle count and a low-order buffer address, of which the buffer address portion is used to select the location in the memory 23D. The index is assigned to the digest when it is created, and does not change thereafter (as long as it remains in the valid zone of memory 23D). Hence each time the digest is copied into the memory 23D, it is written into the same location and over-writes the previous version there, so keeping the two copies of the digest (in memories 22D and 23D) identical.

Returning now to what happens when a new digest is created in register 30, the corresponding digest in memory 22D may be invalid. In that case, the new digest has to be written into memory 22D. (If the key of the new digest is not new, then this will effectively erase and rewrite the previous contents of the relevant location 32.)

This new digest in memory 22D has to be given an index. The contents of the cycle counter 44 and the head pointer register 40 are used for this, and so are copied into the index register portion 33I.

This new digest also has to be copied into the memory 23D. On the creation of a new digest, the head pointer in register 40 is incremented (immediately after its old value has been used in generating the index of the new digest in memory 22D), so increasing the valid zone in memory 23D by one location, and the new digest is copied into this new leading location of the valid zone.

FAST LINK UNIT OPERATION—VALIDITY TESTING

Each time a new digest is created in register 30, a determination must be made of whether or not the corresponding digest in memory 22D is valid. Validity testing is performed by validity test logic 46, which carries out several tests; a main one (ie one which is normally determinative) plus several minor ones.

The main test consists of comparing the index in register section 33I with the cycle count and the head and tail pointers from registers 40, 41, and 45. If the buffer address of the index is between the head and tail counts (taking the cycle count into consideration), then the digest is valid; otherwise, it is invalid. (If the head count is more than the tail count, then the valid zone "between" the two counts is the single memory area in the central part of the memory, as shown by the shaded area 42; if the head count is less than the tail count, then the valid zone is the two memory areas between the two pointer addresses and the ends of the (physical) memory.)

One minor validity test is performed by the adder 34; if the addition of the values in register portions 30V and 33V results in an overflow (of either section of the value), the digest is treated as invalid. (This results in the digest buffer memory 23D containing two digests with the same key. The node management processor and the node digest memory may or may not be able to combine them if the later one should reach the node digest memory before the earlier one has been sent off to the network management station.)

Another minor validity test is required to deal with a digest key which recurs after such a long interval that the cycle count may itself have cycled, so that the current cycle count in fact matches the cycle count in the digest index. If that happens, then when the key does recur, its digest would be treated as valid (by the validity test logic 46), and would be copied into a location in memory 23D which is in fact occupied by a completely different digest.

To prevent this, cycle check logic 47 is provided, which includes an address counter (not shown) which cycles repeatedly through the digest memory 22D. For each location in turn, the digest is read out and the cycle count in its index is compared with the current cycle count from register 45. Taking the current cycle count as cyclic, it can be regarded as dividing its total range into two halves, one forward and one trailing, with the count always advancing into the forward half (and so also advancing the other boundary between the forward and trailing halves). If the cycle count in the digest index is in the trailing half of the cycle count range, the digest is made invalid. (Obviously the details of this test can be varied.)

The digest can be made invalid by, eg, resetting a validity bit in its key to zero. The next time that a new digest in register 30 has that key, the digest with that key in memory 22D will then be treated as invalid and replaced by a new digest (with its validity bit being set to 1).

The operation of the cycle check logic 47 is a background process, which needs to cycle through the memory 22D only as fast as the cycle count 45 cycles, and therefore imposes only an extremely low processing load.

I claim:

1. In a link unit in a node in a digital message routing network, said node being one of a plurality of nodes, a digest processing means for generating and compressing a plurality of accounting digests, each of said digests having a unique key representing the nature and route of a corresponding message and a value associated with the message, characterized in that the digest processing means comprise:
    a first memory into which said digests are written and compressed at locations determined by their corresponding unique keys;
    a second memory operated as a cyclic buffer, an address of a head of said cyclic buffer included in each of said digests in the first memory, said head providing an index; and
    copying means for each time one of said digests is created or changed in the first memory, copying it into the second memory at a location in the second memory determined by the index of the one of said digests.

2. The digest processing means according to claim 1, further comprising:
    a validity test logic fed when the one of said digests is to be created or changed in the first memory, with the index of the digest and the address of the head and an address of a tail of the cyclic buffer to determine whether the corresponding location in the second memory is valid and, if not, to cause a new digest to be created in the first memory.

3. The digest processing means according to claim 2 further comprising a cycle counter, the contents of which are concatenated with an address of the head of the second memory to form an updated digest index.

4. The digest processing means according to claim 3 further comprising:
    a microprocessor coupled to the first and second memories, said microprocessor used to handle a processing load of said link unit; and
    a third, instruction, memory coupled to the microprocessor.

5. The digest processing means according to claim 4, characterized by a digest memory receiving the updated digest index from the second memory of the link unit and a management processor which compresses into the digest memory digests from all nodes.

6. The digest processing means according to claim 2 further comprising:
    a microprocessor coupled to the first and second memories, the microprocessor used to handle the processing load of said link unit; and
    a third, instruction, memory coupled to the microprocessor.

7. The digest processing means according to claim 6, characterized by a digest memory receiving the updated digest index from the second memory of the link unit and a management processor which compresses into the digest memory digests from all nodes.

8. The digest processing means according to claim 1 further comprising:
    a microprocessor coupled to the first and second memories, the microprocessor used to handle the processing load of the link unit; and
    a third, instruction, memory coupled to the microprocessor.

9. The digest processing means according to claim 8, characterized by a digest memory receiving the updated digest index from the second memory of the link unit and a management processor which compresses into the digest memory digests from all nodes.

10. A method of generating and compressing a plurality of accounting digests in a link unit in a node in a digital message routing network, said network having a plurality of nodes, each of said nodes having a plurality of link units, each one of said digests consisting of a unique key representing the nature and route of a corresponding message and a value associated with the corresponding message, comprising the steps of:
    writing and compressing the digests at locations determined by their unique keys in a first memory;
    as each one of said digests in the first memory is created, including in said digest an address of the head of a second memory operated as a cyclic buffer as an index; and each time one of said digests is created or changed in the first memory, copying it a copying means into the second memory at a location in the second memory determined by the index of the digest.

11. The method of generating and compressing a plurailty of accounting digests according to claim 10 including the step of:

testing, when a new digest is to be created or changed in the first memory, its validity using an index of the digest and the address of the head and an address of a tail of the cyclic buffer to determine whether the corresponding location in the second memory is valid and, if not, to cause a new digest to be created in the first memory.

12. The method of generating and compressing a plurality of accounting digests according to claim 11 further including the step of:

concatenating the contents of a cycle counter with the address of the head of the second memory to form the index of the digest.

13. The method of generating and compressing a plurality of accounting digests according to claim 12 further including the step of:

compressing memory digests from the plurality of link units into a node digest memory fed from the second memories of the link units by a management processor.

14. The method of generating and compressing a plurality of accounting digests according to claim 11 further including the step of:

compressing memory digests from the plurality of link units into a node digest memory fed from the second memories of the link units by a management processor.

15. The method of generating and compressing a plurality of accounting digests according to claim 10 further including the step of:

compressing memory digests from the plurality of link units into a node digest memory fed from the second memories of the link units by a management processor.

* * * * *